(12) United States Patent
Al-Enizi et al.

(10) Patent No.: US 10,456,776 B1
(45) Date of Patent: Oct. 29, 2019

(54) METHOD OF FABRICATING A PHOTOCATALYST FOR WATER SPLITTING

(71) Applicant: KING SAUD UNIVERSITY, Riyadh (SA)

(72) Inventors: Abdullah M. Al-Enizi, Riyadh (SA); Tansir Ahamad, Riyadh (SA); Ayman Yousef, Jazan (SA)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 16/281,592

(22) Filed: Feb. 21, 2019

(51) Int. Cl.
| | |
|---|---|
| *B01J 23/72* | (2006.01) |
| *B01J 35/00* | (2006.01) |
| *B01J 27/04* | (2006.01) |
| *B01J 23/06* | (2006.01) |
| *B01J 35/02* | (2006.01) |
| *B01J 37/08* | (2006.01) |
| *B01J 37/04* | (2006.01) |

(Continued)

(52) U.S. Cl.
CPC .............. *B01J 35/004* (2013.01); *B01J 23/06* (2013.01); *B01J 27/04* (2013.01); *B01J 35/023* (2013.01); *B01J 35/026* (2013.01); *B01J 37/04* (2013.01); *B01J 37/08* (2013.01); *C01B 3/042* (2013.01); *D01D 5/003* (2013.01); *D01D 5/38* (2013.01); *D01D 10/02* (2013.01); *B82Y 30/00* (2013.01); *C01B 2203/0277* (2013.01); *C01B 2203/1076* (2013.01)

(58) Field of Classification Search
CPC . B01J 35/004; B01J 23/06; B01J 27/04; B01J 35/023; B01J 35/026; B01J 37/04; B01J 37/08; C01B 3/042; C01B 2203/0277; C01B 2203/1076; D01D 5/003; D01D 5/38; B82Y 30/00
USPC .................................. 502/216; 977/762, 811
See application file for complete search history.

(56) References Cited

U.S. PATENT DOCUMENTS 6,653,356 B2 * 11/2003 Sherman .............. B01J 13/0047
423/610
7,253,452 B2 * 8/2007 Steckel .................. B82Y 20/00
257/103

(Continued)

FOREIGN PATENT DOCUMENTS

| CN | 103611531 A | 3/2014 |
| WO | 09070169 A1 | 6/2009 |

(Continued)

OTHER PUBLICATIONS

Ajay Kushwaha, et al., "ZnS shielded ZnO nanowire photoanodes for efficient water splitting." Electrochimica Acta 130, pp. 222-231. (Year: 2014).*

(Continued)

*Primary Examiner* — Patricia L. Hailey
(74) *Attorney, Agent, or Firm* — Richard C. Litman; Nath, Goldberg & Meyer

(57) ABSTRACT

The method of fabricating a photocatalyst for water splitting includes electrospinning a Zn-based solution mixed with CdS nanoparticles and then calcining to produce CdS nanoparticle decorated ZnO nanofibers having significant photocatalytic activity for water splitting reactions. The photocatalyst fabricated according to the method can produce $H_2$ at a rate of 820 $\mu molh^{-1}g^{-1}$ catalyst from aqueous solution under light irradiation.

17 Claims, 5 Drawing Sheets

(51) Int. Cl.
*D01D 5/00* (2006.01)
*D01D 5/38* (2006.01)
*D01D 10/02* (2006.01)
*C01B 3/04* (2006.01)
*B82Y 30/00* (2011.01)

(56) References Cited

U.S. PATENT DOCUMENTS

| | | | | |
|---|---|---|---|---|
| 7,625,835 | B2* | 12/2009 | Li | B01J 27/04 252/301.4 R |
| 8,277,942 | B2* | 10/2012 | Kim | B82Y 10/00 428/403 |
| 8,414,896 | B2 | 4/2013 | Delai | |
| 9,441,324 | B2 | 9/2016 | Keller-Spitzer | |
| 9,463,440 | B2* | 10/2016 | Chopra | B01J 37/08 |
| 2005/0042743 | A1* | 2/2005 | Kawai | A61L 9/16 435/287.2 |
| 2009/0286068 | A1* | 11/2009 | Niguma | C08G 77/442 428/327 |
| 2011/0079275 | A1 | 4/2011 | Qiao | |

FOREIGN PATENT DOCUMENTS

| | | | |
|---|---|---|---|
| WO | 12052524 | A1 | 4/2012 |
| WO | WO-2017023082 | A1* | 2/2017 ............ B01J 23/06 |
| WO | 2017116316 | A1 | 7/2017 |

OTHER PUBLICATIONS

Puttaswamy Madhusudan, et al., "Nature inspired ZnO/ZnS nanobranch-like composites, decorated with Cu(OH)2 clusters for enhanced visible-light photocatalytic hydrogen evolution." Applied Catalysis B: Environmental, pp. 1-37. (Year: 2019).*

Rajendra C. Pawar et al., "Single-step sensitization of reduced graphene oxide sheets and CdS nanoparticles on ZnO nanorods as visible-light photocatalysts." Applied Catalysis B: Environmental 144, pp. 57-65. (Year: 2014).*

Ankit Kumar Vishwakarma et al., "Fabrication and characterization of CdS doped ZnO nano thick films." Vacuum 155, pp. 214-218. (Year: 2018).*

Liu et al. "ZnO nanofiber and nanoparticle synthesized through electrospinning and their photocatalytic activity under visible light". J. Am. Ceram. Soc. 91.4 (2008): 1287-1291.

Tak et al. "Fabrication of ZnO/CdS core/shell nanowire arrays for efficient solar energy conversion". J Mater. Chem., 19 (2009):5945-5951.

Afeesh et al. "Nematic shaped cadmium sulfide doped electrospun nanofiber mat: highly efficient, reusable; solar light photocatalyst". Colloids and Surfaces A: Physicochemical and Engineering Aspects 409 (2012): 21-29.

Gualandi et al. "Nanohybrid materials by Electrospinning". Advanced Polymer Science, 267 (2015): 87-142.

Cheng et al. "A facile method to prepare CdS/polymer nanocomposite fibers for the photodegradation of methylene blue under sunlight". Journal of Polymer Engineering, 37.2 (2016): 107-112.

* cited by examiner

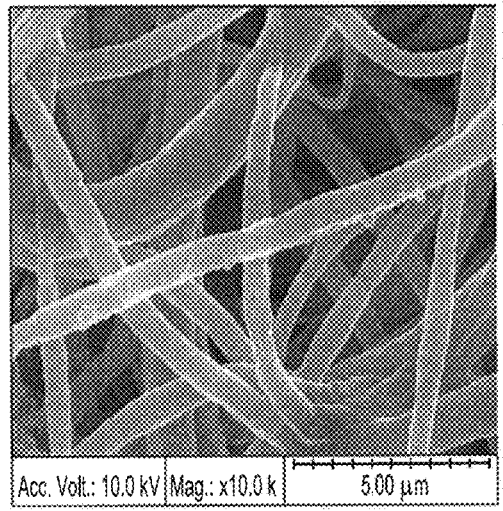
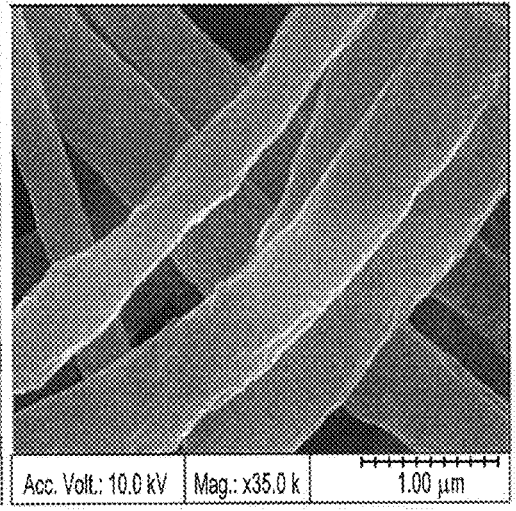
FIG. 1A                    FIG. 1B
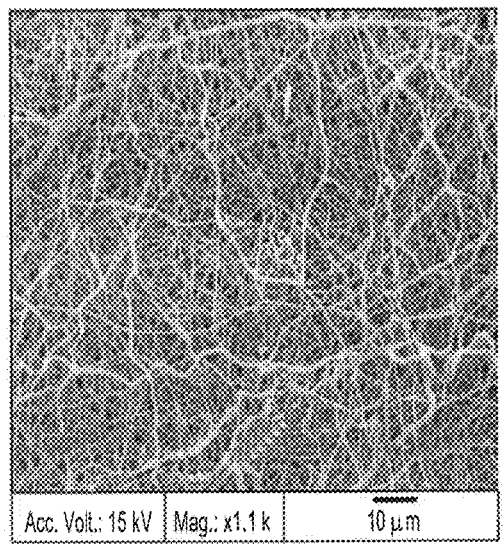
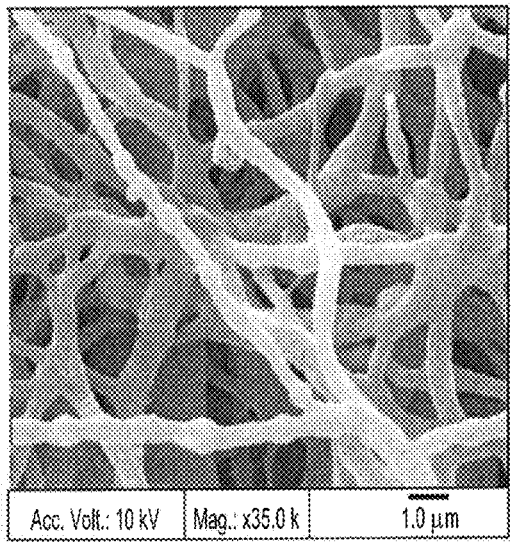
FIG. 1C                    FIG. 1D

METHOD OF FABRICATING A PHOTOCATALYST FOR WATER SPLITTING

BACKGROUND OF THE INVENTION

1. Field of the Invention

The disclosure of the present application relates to a photocatalyst, and particularly to a photocatalyst for water splitting, a method of fabricating the photocatalyst for water splitting, and a method of water splitting using the photocatalyst.

2. Description of the Related Art

Hydrogen in the form of $H_2O$ can be a potentially abundant alternative clean fuel that may reduce the need and use of fossil fuels, such as petrol, diesel, natural gas, gasoline, coal, and others. Hydrogen may be produced from water by water splitting, i.e., splitting the water into hydrogen and oxygen. Water-splitting may be achieved by means of, for instance, a photocatalyst in the presence of sunlight or, alternatively, by electrolysis. Effective and efficient electrolysis of water requires a higher bath voltage than the theoretical reaction voltage of 1.23 V. Solar energy may be utilized for electrolysis of water to produce hydrogen, but very high performance solar batteries would be needed. Short service life and high manufacturing and maintenance costs of such solar batteries make conventional electrolysis methods using solar energy inapplicable to actual practice.

Solar energy is an environmentally friendly energy source for $H_2$ generation by water splitting, as it avoids production of gases such as carbon monoxide and carbon dioxide. Photolysis of water splits water molecules into hydrogen and oxygen by light energy. Typically, photolysis occurs in the presence of a photocatalyst that absorbs light energy and transfers the energy to the water molecules. Photocatalysts based on semiconducting materials that absorb light energy have been demonstrated in applications of water splitting by harvesting a maximum solar light. In particular, various wide band gap semiconductors have been used as potential photocatalysts for hydrogen production from water splitting (e.g. $TiO_2$, ZnO and $SnO_2$). However, these photocatalytic semiconductors cannot effectively harvest photons in the visible light region, limiting harvesting to approximately 4% of the entire solar spectrum. In addition, these semiconducting materials exhibited rapid recombination of photo carriers, decreasing hydrogen evolution efficiency. Also, single phase photocatalysts generally exhibit lower separation efficiency of photocarriers compared with integrated multi-semiconductor systems having a suitable band gap of 1.8-2.4 eV, matching the energy band for $H_2$ evolution. Moreover, such integrated multi-semiconductor systems may exhibit high quantum efficiency and stability for photocatalytic water splitting. In order to enhance photosensitivity of the wide band gap semiconducting oxides towards the visible region; an integrated coupling method can be employed with narrow band semiconductors (e.g. ZnS, CdS, CuO, CuS, $In_2O_3$), which can easily generate electron-hole pairs. In addition, they possess different redox energy levels allowing for more efficient charge separation and prolonging the lifetime of the charge carriers.

In this regard, incorporating CdS and ZnO may avoid the previously noted issues and enhance hydrogen evolution from water splitting due to several factors: (1) the narrow band gap (2.4 eV) of CdS is capable of tuning the ZnO band gap (3.37 eV) to harvest visible light solar light; (2) compatible lattice structure (hexagonal wurtzite structure) of CdS and ZnO may lead to a strong interaction and enhancement of the effective interband charge transfer from CdS to ZnO; and (3) the more negative band edge of CdS relative to that of the $H_2/H^+$ redox potential make it particularly suitable for hydrogen evolution.

On the other hand, CdS is sensitive to photocorrosion during water splitting. Photocorrosion can be inhibited by controlling the structure of the prepared material. One-dimensional (1D) CdS/ZnO nanostructures (e.g. nanorods, nanowires, nanofibers, etc.) have been used to inhibit photocorrosion by enveloping the CdS in ZnO and enhance the performance of hydrogen production. Among the reported 1D nanostructures, nanofibers (NFs) exhibit high surface area, high axial ratio, good mechanical properties and unique physical properties that have received special consideration. NFs have lower grain boundaries, which increases probability of electron over other nanostructures. Electrospun NFs have been shown to approximately double the available surface area relative to continuous thin films. Consequently, NFs are excellent candidates for hydrogen evolution from water splitting.

Thus, a method of fabricating a photocatalyst for water splitting solving the aforementioned problems is desired.

SUMMARY OF THE INVENTION

A method of fabricating a photocatalyst for water splitting provided herein includes incorporating CdS nanoparticles (NPs) on ZnO nanofibers (NFs) using electrospinning to produce electrospun NP/NF mats. The electrospun NP/NF mats can be calcined to produce crystalline CdS NP-decorated ZnO NFs.

These and other features of the present invention will become readily apparent upon further review of the following specification and drawings.

BRIEF DESCRIPTION OF THE DRAWINGS

FIGS. 1A-1B show field effect scanning electron microscope (FESEM) images of the CdS NP-doped ZnO NFs before calcination; FIGS. 1C-1D show scanning electron microscope (SEM) images of CdS NP-doped ZnO NFs after calcination at 200° C. for 30 min.

FIG. 4A shows a TEM image for a single Cds NP-doped ZnO NF; FIG. 4B shows an HR-TEM image of the marked area in FIG. 4A; FIG. 4C shows a scanning transmission electrode microscopy (STEM) image of one nanofiber with STEM-EDX linescan; FIG. 4l) shows TEM-EDX line analysis for the line in FIG. 4C.

DETAILED DESCRIPTION OF THE PREFERRED EMBODIMENTS

Figure 2:
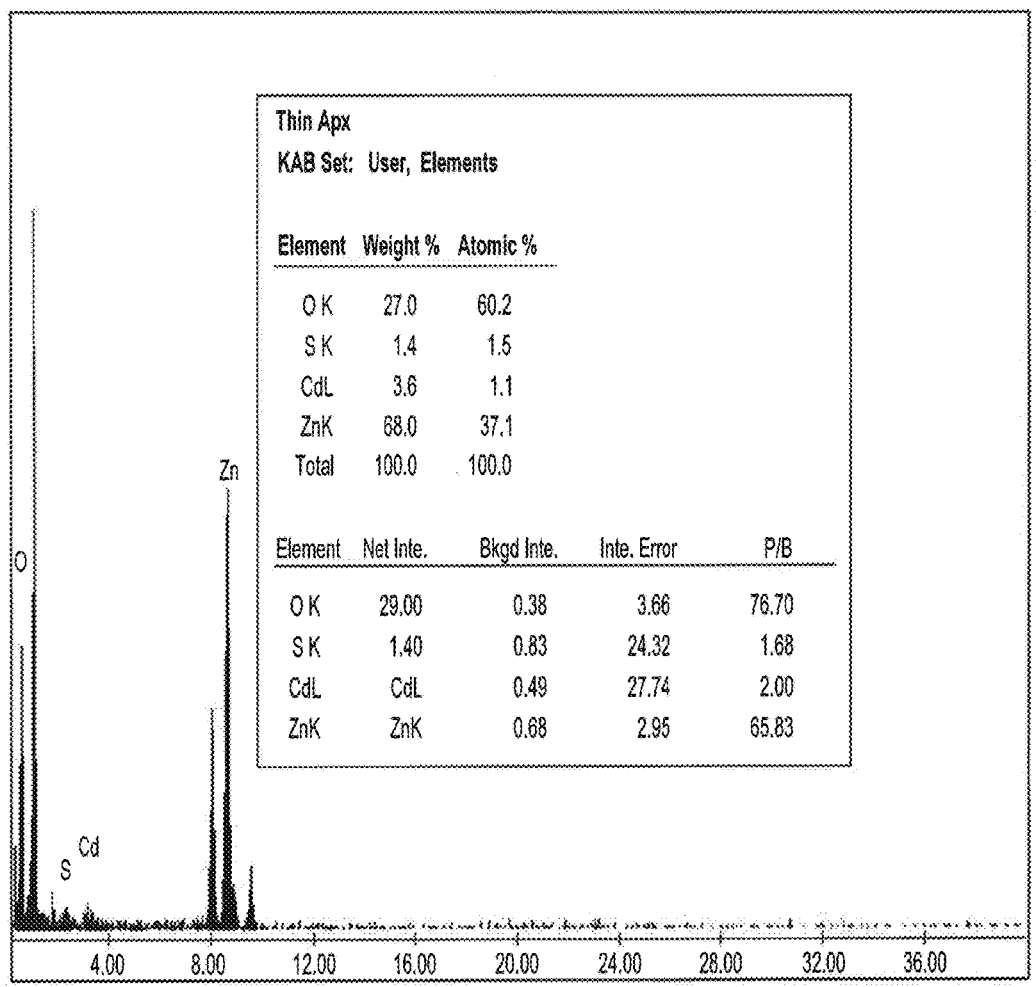
FIG. 2 shows energy-dispersive X-ray (EDX) analysis of the CdS NP-doped ZnO NFs after calcination at 200° C. for 30 min.

A method of fabricating a photocatalyst for water splitting provided herein includes providing a first semiconductor in nanoparticle form; mixing a polymer solution with a solution including an organic solvent and a salt of Zn, Ti or Sn, to provide an electrospinning sol-gel; adding the first semiconductor in nanoparticle form to the electrospinning sol-gel to provide a colloidal solution; stirring the colloidal solution for a first period of time; electrospinning the colloidal solution after the first period of time to provide electrospun nanofiber (NF) mats; drying the NF mats under vacuum for a second period of time; and calcinating the NF mats to provide the photocatalyst for water splitting (also referred to as composite NFs, herein). The photocatalyst for water splitting can include nanofibers of a second semiconductor doped with the nanoparticles of the first semiconductor. The first semiconductor can include a narrow band gap semiconductor, such as ZnS, CdS, CuO, CuS, or $In_2O_3$. The second semiconductor can include a wide band gap semiconductor, such as $TiO_2$, ZnO or $SnO_2$. The polymer solution can include a polymer having a low thermogravimetric analysis (TGA) profile, such as poly($\varepsilon$-caprolactone) and an organic solvent.

In an exemplary embodiment, the method of fabricating a photocatalyst for water splitting provided herein includes producing cadmium sulfide (CdS) nanoparticles (NPs), mixing a polymer solution with a solution including a zinc salt to form an electrospinning sol-gel, adding the CdS NPs to the electrospinning sol-gel to provide a colloidal solution; stirring the colloidal solution for a first period of time; electrospinning the colloidal solution after the first period of time to provide electrospun nanofiber (NF) mats; drying the NF mats under vacuum for a second period of time; and calcinating the NF mats to provide the photocatalyst for water splitting. The photocatalyst for water splitting comprises nanofibers of ZnO doped with the nanoparticles of CdS. In an embodiment, the photocatalyst comprises only zinc, cadmium, oxygen, and sulphur.

The polymer solution can include a polymer having a low thermogravimetric analysis (TGA) profile, such as poly($\varepsilon$-caprolactone) and an organic solvent, e.g., dimethylformamide (DMF). The solution including a zinc salt can include zinc acetate (ZnAc) and an organic solvent, e.g., dimethylformamide (DMF) (e.g., a solution prepared by adding 1 g of ZnAc to 3 mL of DMF). For example, about 15 mL of poly($\varepsilon$-caprolactone) solution can be added to the ZnAc solution and stirred for about three hours at 50° C. to form the clear sol-gel. Once the CdS NPs are added to the sol-gel, the resulting colloidal solution can be stirred continuously for about 5 hours prior to electrospinning. The NF mats formed after electrospinning can be dried under vacuum at about 50° C. for about 24 hours. After drying, the nanofiber mats can be calcined in Ar atmosphere at about 200° C. for about 30 minutes. The poly($\varepsilon$-caprolactone) is removed after heating to 200° C. The resulting CdS/ZnO nanofibers can be hexagonal and crystalline in nature.

The composite NFs demonstrated good photocatalytic performance in hydrogen production relative to native ZnO NFs and CdS NPs prepared independently under similar conditions (see the examples in the following detailed description). Hydrogen evolution was approximately 820 µmolh-1 g-1, 115 µmolh-1 g-1 and 180 µmolh-1 g-1 for the composite NFs, native ZnO NFs and CdS NPs, respectively. In addition, the composite NFs exhibited good photostability, possibly due to the nanofibrous morphology facilitating photocarrier transport and increasing active sites on the surface of the photocatalytic materials. The method may be adapted to synthesize other composite nanofibers using the electrospinning technique.

A method for hydrogen production using water splitting can include adding the photocatalyst to an aqueous solution; and irradiating the aqueous solution including the photocatalyst to produce hydrogen. The aqueous solution can include $Na_2SO_3$ and $Na_2S$ ions. The $Na_2SO_3$ and $Na_2S$ ions can behave as a hole scavenger for the photocatalyst and/or avoid photo-corrosion. The production of hydrogen can be measured using gas chromatography. The aqueous solution can be irradiated at room temperature. In an embodiment, about 50 mg of the photocatalyst is added to about 50 mL of the aqueous solution. In an embodiment, the photocatalyst is sonicated, e.g., for 30 minutes. In an embodiment, about 820 $\mu molh^{-1}g^{-1}$ of hydrogen is produced. In an embodiment, the photocatalyst is reusable. For example, the photocatalyst can be used for five consecutive runs, while maintaining excellent stability.

Specific embodiments of the present method of fabricating a photocatalyst for water splitting are illustrated in the following examples. The structure, synthesis and function of an exemplary photocatalyst are also provided in the following examples.

The present teachings are illustrated by the following examples.

Example 1

Preparation of Exemplary CdS/ZnO Nanofibers

CdS NP-doped ZnO NFs were prepared as follows. Dispersed cadmium sulfide (CdS) NPs were prepared by adding an ammonium sulfide (($NH_4)_2S$) solution (typically 40-48 wt. % in water) to a cadmium acetate (CdAc) solution (e.g., a solution including 1 g of CdAc in 3 mL dimethylformamide (DMF)) under vigorous stirring. An electrospinning solution was prepared by adding 15 mL of poly($\varepsilon$-caprolactone) solution (e.g., 7.5 wt. % poly($\varepsilon$-caprolactone) in an organic solvent, e.g., DMF) to a zinc acetate (ZnAc) solution (e.g., 1 g of ZnAc in 3 mL DMF). The obtained electrospinning solution was kept under stirring for 3 h at 50° C. to ensure proper mixing and formation of a clear sol-gel. CdS NPs were added to the clear sol-gel to form a colloidal solution. The colloidal solution was kept under continuous stirring for 5 h prior to electrospinning. Electrospinning of the solution provided electrospun NF mats. The electrospun NF mats were dried under vacuum at 50° C. for 24 h and then calcined in Ar atmosphere at 200° C. for 30 min, resulting in the CdS NPs-doped ZnO NFs, which took the form of a powder. For comparison, CdS NPs free of ZnO NFs and ZnO NFs free of CdS NPs were prepared as above and used separately.

Example 2

Photocatalytic Activity Measured

The rate of $H_2$ production from water splitting catalyzed by the composite NFs, the CdS NPs alone, and the ZnO NFs alone, under visible light was measured in a typical water-filled gas burette system. A 2000 W mercury lamp, fixed at a distance of 10 cm from the burette system, was used as a light source. In each experiment, 50 mg of the catalyst was transferred into a reaction flask having 50 mL of deionized water containing $Na_2SO_3$ and $Na_2S$ as a sacrificial reagent.

The reactor was sealed tightly and sonicated to disperse the photocatalyst completely in the water with sacrificial reagents. To avoid CdS photocorrosion, the gas-burette system was perfused with $N_2$ gas before starting the reaction in the presence of the sacrificial electron donor to remove any dissolved oxygen. The reaction was conducted under stirring at a rate of 600 rpm and 25° C. The volume of the gas evolved was measured by recording the displacement of water level every minute; the gas passed through the graduated cylinder filled with water containing KOH to estimate the obtained gas and to remove any released $SO_2$ gas, oxygen and moisture before analysis. The $H_2$ gas produced was analyzed by a gas chromatograph (GC-2010 Plus, Shimadzu, Ar gas (99%) was used as a carrier gas with flow rate of 20 $mLmin^{-1}$). The reaction was ceased when no gas was generated. It was observed that no $H_2$ gas was produced in the absence of either light irradiation or photocatalyst.

FE-SEM images of the electrospun NFs after vacuum drying show that the samples are composed of randomly distributed, smooth surfaced and beads-free NFs with good morphology (FIGS. 1(A) and 1(B)). The calcination of the as-prepared NFs did not affect the nanofibrous morphology (FIGS. 1(C) and 1(D)). Entanglement in the network structure of the NFs without any specific direction was observed. The network structure was highly interconnected with multilayered NFs. The energy dispersive X-ray (EDX) spectroscopic analysis (FIG. 2) of NFs indicates the presence of zinc (Zn), cadmium (Cd), oxygen (O), and Sulphur (S) elements in the spectrum, only. No other elements were detected. The inset to FIG. 2 summarizes the atomic and weight percent of the detected elements.

Figure 3:
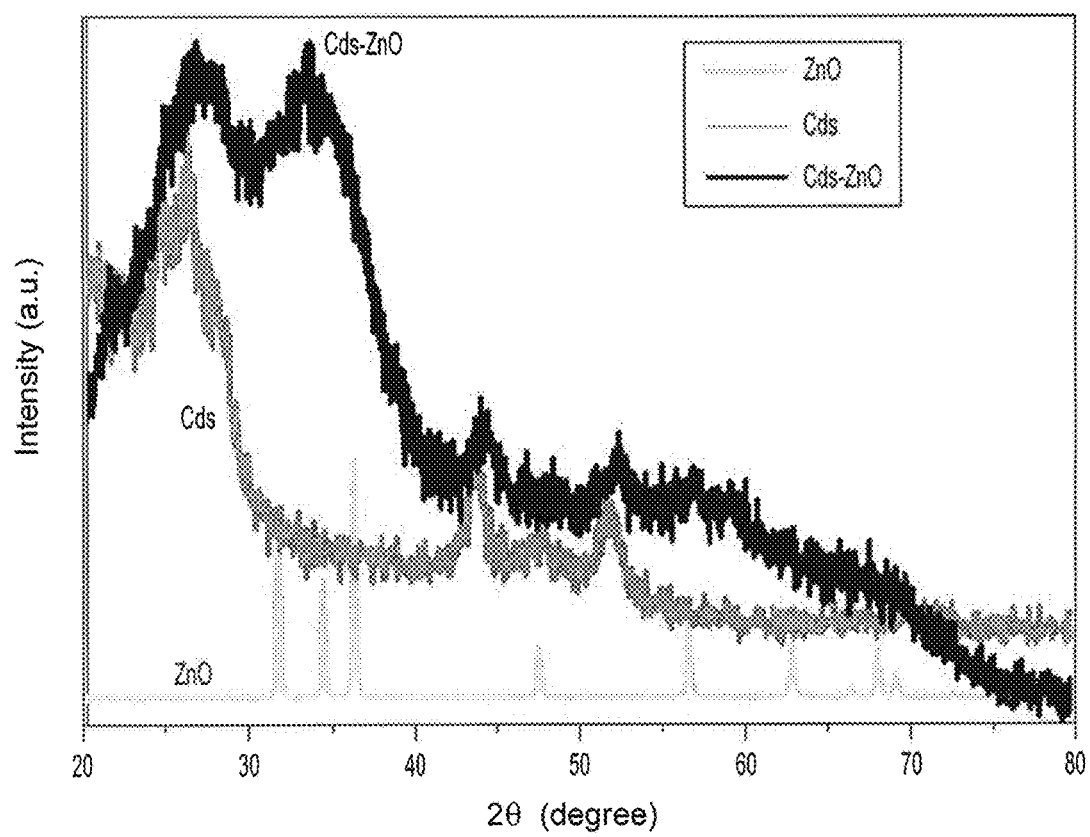
FIG. 3 shows X-ray diffraction (XRD) patterns of CdS NPs, ZnO NFs, and CdS NP-doped ZnO NFs after calcination.

FIG. 3 shows the XRD patterns of the as-prepared catalysts (NF powder). From the patterns, the standard ZnO diffraction peaks indicate formation of a hexagonal wurtzite structure of ZnO (Sp.Gr P63mc(186), JCPDS 36-1451). In addition, the CdS diffraction peaks indicate the formation of a hexagonal wurtzite structure CdS (Sp.Gr Fm43m(216), JCPDS 10-454). The CdS NP-doped ZnO NFs exhibit a mixture of crystalline phases from the CdS and ZnO.

Figure 4A:
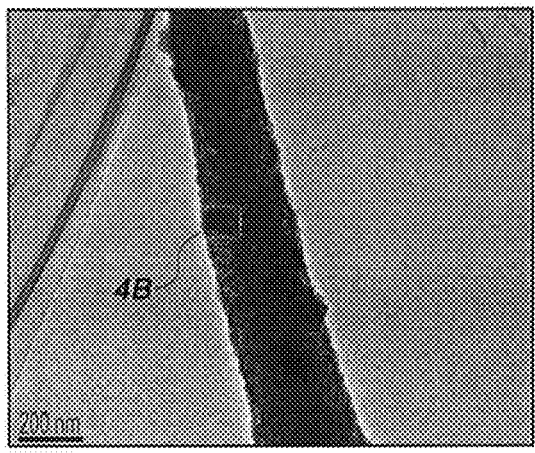
FIGS. 4A-4D show transmission electrode microscopy (TEM) images of the calcined Cds NP-doped ZnO NFs.
Figure 4B:
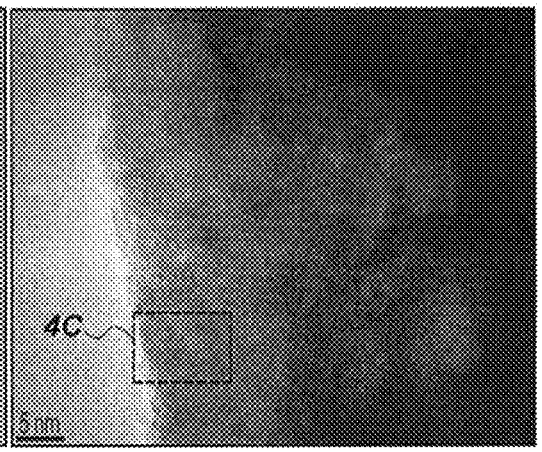
Figure 4C:
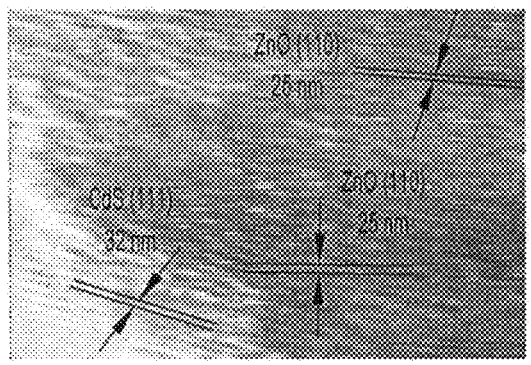
Figure 4D:
Figure 4E:
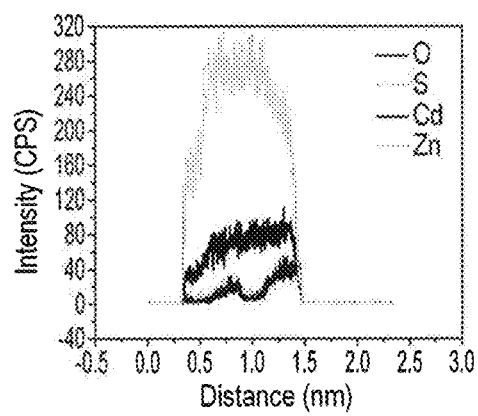
FIG. 4E shows the TEM-EDX spectrum of the nanofibers.

FIGS. 4A-4D) show TEM, HR-TEM, TEM-EDX and TEM-EDX line-scan images, respectively, for the synthesized NFs. As shown in FIG. 4A, the TEM image indicates that the surface of the composite NF is very rough, which may be due to crystallization of CdS and ZnO. Further, the CdS NPs are completely enveloped into the ZnO NFs. The HR-TEM image of FIG. 4B indicates the presence of parallel atomic planes. Lattice fringes are visible, which are consistent with the lattice spacing planes of hexagonal wurtzite ZnO (JCPDS 36-1451) and hexagonal CdS (JCPDS 10-454), indexed and labeled in FIG. 4B. This finding reveals substantial crystallinity of the composite NFs. This is confirmed by the TEM-EDX line-scan analysis of the line indicated in FIG. 4A, the results of which are shown in FIG. 4D. The TEM-EDX line-scan and spectrum (FIG. 4E) confirms the presence of Zn, Cd, O, and S. The Cd and S appear with a similar distribution, which confirms the formation of CdS, rather than $CdSO_4$. In addition, Zn and O are the most surface elements in the line-EDX, consistent with the full envelopment of CdS NPs with the ZnO NFs. In other words, CdS NPs are completely covered by ZnO NFs, and are thereby protected from photocorrosion during photocatalytic reaction.

Example 3

Photo-Splitting Assay

The photocatalytic activity of the composite NFs were tested by evaluating $H_2$ production from an aqueous solution including $Na_2SO_3/Na_2S$. This salt was used as a hole scavenger for the prepared photocatalyst, as well as to avoid photocorrosion of CdS. No hydrogen was evolved in the presence of the light source and absence of a photocatalyst.

Figure 5:
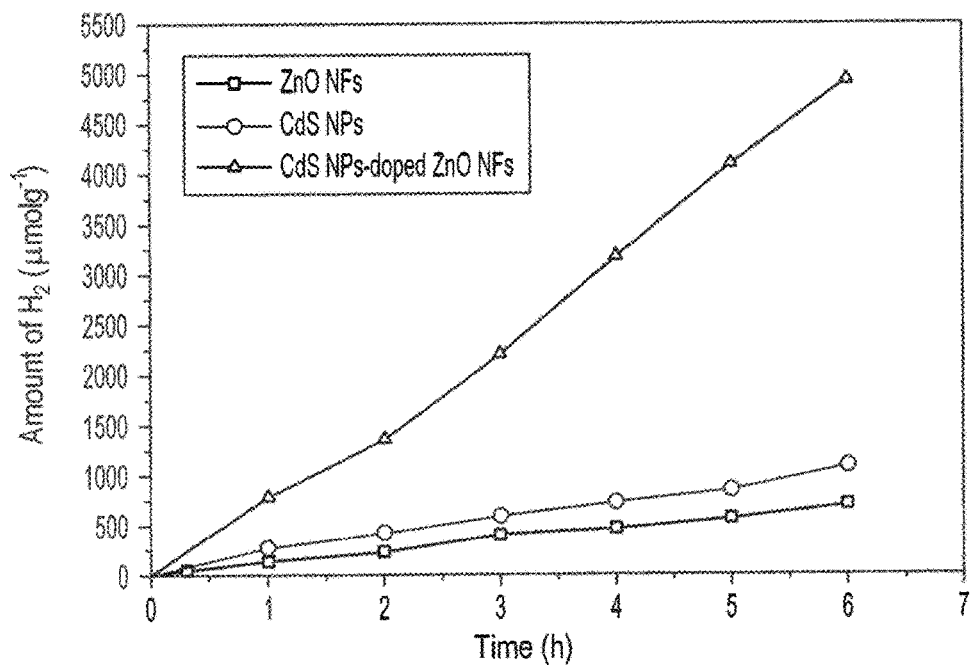
FIG. 5 is a graph showing the amounts of $H_2$ gas photocatalytically evolved from an aqueous solution containing $Na_2SO_3$ and $Na_2S$ in the presence of the CdS NPs-doped ZnO NFs, ZnO NFs, and CdS NPs.

The photocatalytic activity of the composite NFs was compared to the native ZnO NFs and CdS NPs prepared under identical experimental conditions (FIG. 5). Under light irradiation, the ZnO NFs and CdS NPs controls produced a lower amount of $H_2$ compared to the composite NFs. The composite NFs, ZnO NFs, and CdS NPs produced up to 820 $\mu molh^{-1}g^{-1}$, 115 $\mu molh^{-1}g^{-1}$, and 180 $\mu molh^{-1}g^{-1}$, respectively.

These differences in photocatalytic activity could be due to: the nanofibrous morphology facilitating transport of photocarriers and increasing the surface active sites; high efficiency of visible light absorption; and low recombination rate of photogenerated electron-hole pairs.

The composite NFs exhibited more than twice the photocatalytic activity reported for prior composite core/shell ZnO NFs, which produce only 354 $\mu molh^{-1}g^{-1}$. This may be due to the formation of pure CdS by the present method rather than $Cd_3SO_4$ by prior methods.

Figure 6:
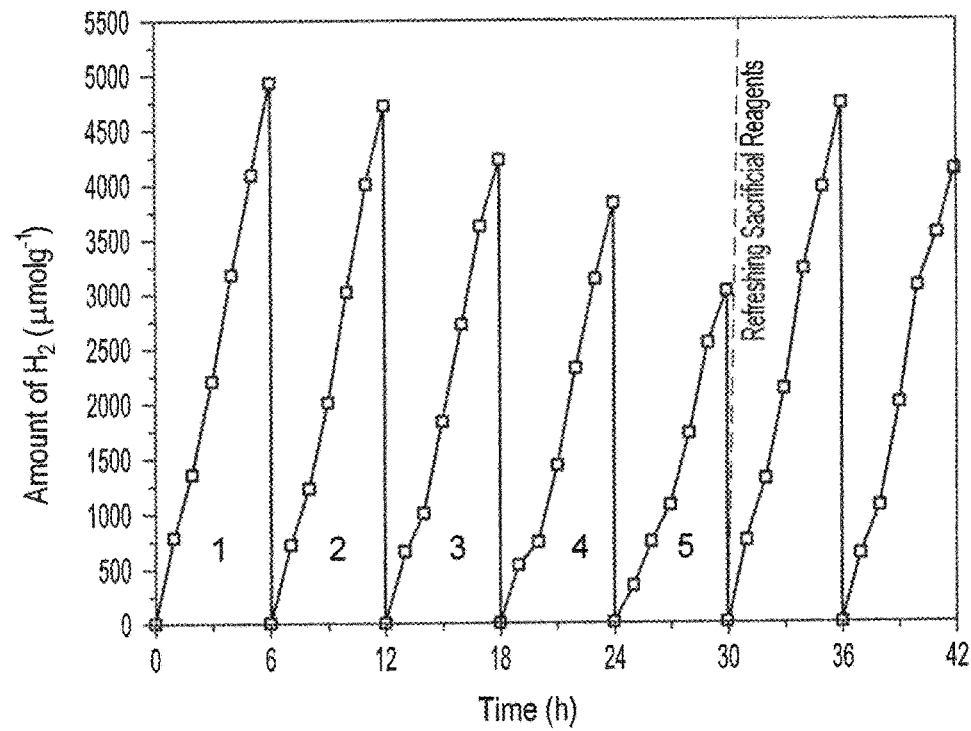
FIG. 6 is a graph showing the reproducibility of photocatalytic $H_2$ gas evolution in the presence of the CdS NPs-doped ZnO NFs.

To evaluate the photo-stability of the prepared composite NFs for practical applications, seven consecutive tests were run under similar conditions, the results of which are shown in FIG. 6. The efficiency of hydrogen evolution decreased modestly with successive cycles. This decrease could be due to consumption of sacrificial electron donating solution. After five consecutive runs, the sacrificial solution was added to make a refresh. Accordingly, the photocatalytic performance reached the original level. These results show excellent stability of the composite NFs as a photocatalyst for hydrogen production.

It is to be understood that the method of fabricating a photocatalyst for water splitting is not limited to the embodiments described above, but encompasses any and all embodiments within the scope of the following claims.

We claim:

1. A method of fabricating a photocatalyst for water splitting, comprising the steps of:
   providing a first semiconductor in nanoparticle form;
   mixing a first solution including an organic solvent with a second solution including an organic solvent to provide an electrospinning sol-gel, the first solution including a polymer and the second solution including a zinc salt;
   adding the first semiconductor in nanoparticle form to the electrospinning sol-gel to provide a colloidal solution;
   stirring the colloidal solution for a first period of time;
   electrospinning the colloidal solution after the first period of time to provide an electrospun nanofiber mat;
   drying the nanofiber mat under vacuum for a second period of time; and
   calcinating the nanofiber mat to provide the photocatalyst for water splitting, wherein the photocatalyst for water splitting includes nanofibers of a second semiconductor doped with the nanoparticles of the first semiconductor, the first semiconductor including a narrow band gap semiconductor selected from the group consisting of ZnS, CdS, CuO, CuS, and $In_2O_3$, the second semiconductor including zinc oxide.

2. The method of claim 1, wherein the organic solvent is dimethylformamide.

3. The method of claim 1, wherein the polymer solution comprises poly(ε-caprolactone).

4. A method for hydrogen production using water splitting, comprising the steps of:

adding the photocatalyst of claim 1 to an aqueous solution, the aqueous solution including $Na_2SO_3$ and $Na_2S$ ions;

irradiating the aqueous solution with solar light to produce hydrogen.

5. The method according to claim 4, wherein the step of irradiating is carried out at room temperature.

6. A method of fabricating a photocatalyst for water splitting, comprising the steps of:

producing cadmium sulfide nanoparticles;

mixing a polymer solution with a solution including a zinc salt to form an electrospinning sol-gel;

adding the cadmium sulfide nanoparticles to the electrospinning sol-gel to provide a colloidal solution;

stirring the colloidal solution for a first period of time;

electrospinning the colloidal solution after the first period of time to provide an electrospun nanofiber mat;

drying the nanofiber mat under vacuum for a second period of time; and calcinating the nanofiber mat to provide the photocatalyst for water splitting, the photocatalyst for water splitting comprising zinc oxide nanofibers doped with cadmium sulphide nanoparticles.

7. The method according to claim 6, further comprising:

forming the cadmium sulphide nanoparticles by combining cadmium acetate with an ammonium sulfide solution under vigorous stirring.

8. The method according to claim 6, wherein the first period of time is about 5 hours and the second period of time is about 24 hours.

9. The method according to claim 8, wherein the calcinating comprises calcinating in Ar atmosphere at about 200° C. for about 30 minutes.

10. The method according to claim 6, wherein the polymer solution comprises poly(€-caprolactone) and an organic solvent.

11. The method according to claim 10, wherein the organic solvent is dimethylformamide (DMF).

12. A photocatalyst produced according to the method of claim 6.

13. A method for hydrogen production using water splitting, comprising the steps of:

adding the photocatalyst of claim 12 to an aqueous solution, the aqueous solution including $Na_2SO_3$ and $Na_2S$ ions;

irradiating the aqueous solution with light to produce hydrogen.

14. The method according to claim 13, wherein the step of irradiating is carried out at room temperature.

15. The method according to claim 13, wherein about 50 mg of the photocatalyst is added to about 50 mL of the aqueous solution.

16. The method according to claim 13, further comprising sonicating the aqueous solution after adding the photocatalyst.

17. The method according to claim 13, wherein the light is solar light.

\* \* \* \* \*